(12) United States Patent
Nygren et al.

(10) Patent No.: US 8,782,458 B2
(45) Date of Patent: Jul. 15, 2014

(54) SYSTEM AND METHOD OF DATA COMMUNICATIONS BETWEEN ELECTRONIC DEVICES

(75) Inventors: Aaron Nygren, Truckee, CA (US);
Anwar Kashem, Cambridge, MA (US);
Edoardo Prete, Arlington, MA (US);
Gerry Talbot, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 316 days.

(21) Appl. No.: 13/306,680

(22) Filed: Nov. 29, 2011

(65) Prior Publication Data

US 2013/0136195 A1     May 30, 2013

(51) Int. Cl.
*G06F 1/00*     (2006.01)
*G11C 7/00*     (2006.01)

(52) U.S. Cl.
USPC ................. 713/500; 713/501; 365/193

(58) Field of Classification Search
USPC ............................................. 713/500, 501
See application file for complete search history.

(56) References Cited

U.S. PATENT DOCUMENTS

| | | | |
|---|---|---|---|
| 5,452,436 A * | 9/1995 | Arai et al. ................ | 713/375 |
| 5,634,042 A | 5/1997 | Kashiwagi et al. | |
| 6,473,439 B1 * | 10/2002 | Zerbe et al. ................ | 370/503 |
| 6,516,362 B1 | 2/2003 | Magro et al. | |
| 7,688,928 B2 * | 3/2010 | Lin et al. .................. | 375/376 |
| 8,159,887 B2 * | 4/2012 | Kizer et al. ................ | 365/193 |
| 2004/0098634 A1 | 5/2004 | Zerbe et al. | |

FOREIGN PATENT DOCUMENTS

| EP | 0347557 A2 | | 12/1989 |
|---|---|---|---|
| JP | 08083240 A | * | 3/1996 |

OTHER PUBLICATIONS

International Search Report for International Application No. PCT/US2012/066284 dated Feb. 28, 2013.

* cited by examiner

*Primary Examiner* — Suresh Suryawanshi
(74) *Attorney, Agent, or Firm* — Park, Vaughan, Fleming & Dowler, LLP

(57) ABSTRACT

A system and method of data communications between a first device and a second device is disclosed. The method includes generating a first clock signal at the first device and generating a second clock signal having a phase offset from the first clock signal. The clock signals are transmitted from the first device to the second device. The method further includes regulating transmission of a read strobe signal sent from the second device to the first device utilizing the first clock signal. The method also includes regulating transmission of a data transfer signal sent from the second device to the first device utilizing the second clock signal.

32 Claims, 4 Drawing Sheets

SYSTEM AND METHOD OF DATA COMMUNICATIONS BETWEEN ELECTRONIC DEVICES

BACKGROUND OF THE INVENTION

1. Field of the Invention

The subject invention relates generally to data communication techniques and particularly to data communication between a processing unit and a memory device.

2. Description of the Related Art

Modern computer systems typically comprise a processing unit and a memory device. The processing unit executes programs, provides computations, etc., as is well known to those skilled in the art. Due to various restraints, the processing unit usually has a limited amount of "on-board" memory to store data. Therefore, external memory is commonly utilized to store the data not stored on the processing unit itself.

One constraint of such computer systems is the speed at which data may be transferred between the processing unit and the memory device. At high speeds, synchronization of a clock signal produced by processing unit and data signals flowing between the processing unit and the memory device must be precisely coordinated. More exactly, when the computer system utilizes synchronous clocking, an alignment between the clock signal and the data signal that allows latching of the data with sufficient margin is necessary.

The clock signal and the data signal must be transmitted and/or received with a well-defined offset in order to ensure such an alignment. For example, in a double-data rate ("DDR") implementation, an offset of 90 degrees between the clock signal and the data signal is typically utilized, while in a single-data rate ("SDR") implementation, an offset of 180 degrees is typically utilized.

In the prior art, a circuit such as a delay-locked loop ("DLL") is often utilized to establish the well-defined offset. However, such circuits require a large physical area, consume precious power resources, and have relatively long locking times in order to function. These long lock times often restrict some features of the system, such as fast and/or frequent power-down cycles.

Another prior art implementation requires utilizing clocks having a higher speed than the data rate; using both the rising and falling edges of the clock signal to establish the phase offset. For example, if the DDR data speed is 1 billion bits per second ("gbps"), a clock of 1 GHz could be utilized where the rising edge of the "clocks", i.e., regulate, the data signal and the falling edge clocks another signal such as a strobe with a half unit interval shift. However, such an implementation may produce physical limitations in the silicon that restricts the top speed of the clock signal.

Accordingly, a data communication system and method utilizing less physical area and less power is desirable. A data communications system with shorter locking times is also desirable. Furthermore, other desirable features and characteristics of the present invention will become apparent from the subsequent detailed description of the invention and the appended claims, taken in conjunction with the accompanying drawings and this background of the invention.

SUMMARY OF EMBODIMENTS

A method of data communications between a first device and a second device is provided. The method includes generating a first clock signal at the first device and generating a second clock signal having a phase offset from the first clock signal. The clock signals are transmitted from the first device to the second device. The method further includes regulating transmission of a read strobe signal sent from the second device to the first device utilizing the first clock signal. The method also includes regulating transmission of a data transfer signal sent from the second device to the first device utilizing the second clock signal.

A data communications system is also provided. The system includes a first device having a clock circuit for generating a first clock signal. The first device also includes a phase offset circuit electrically connected to the clock circuit for generating a second clock signal. The second clock signal has a phase offset from the first clock signal. The system further includes a second device having a read strobe flip-flop in communication with the clock circuit. The read strobe flip-flop regulates transmission of a read strobe signal sent to the first device utilizing the first clock signal. The second device also includes a data-out flip-flop in communication with the phase offset circuit for regulating transmission of a data transfer signal sent to the first device utilizing the second clock signal.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

Referring to the Figures, a method of data communications and a data communications system 10 are shown and described herein.

Figure 1:
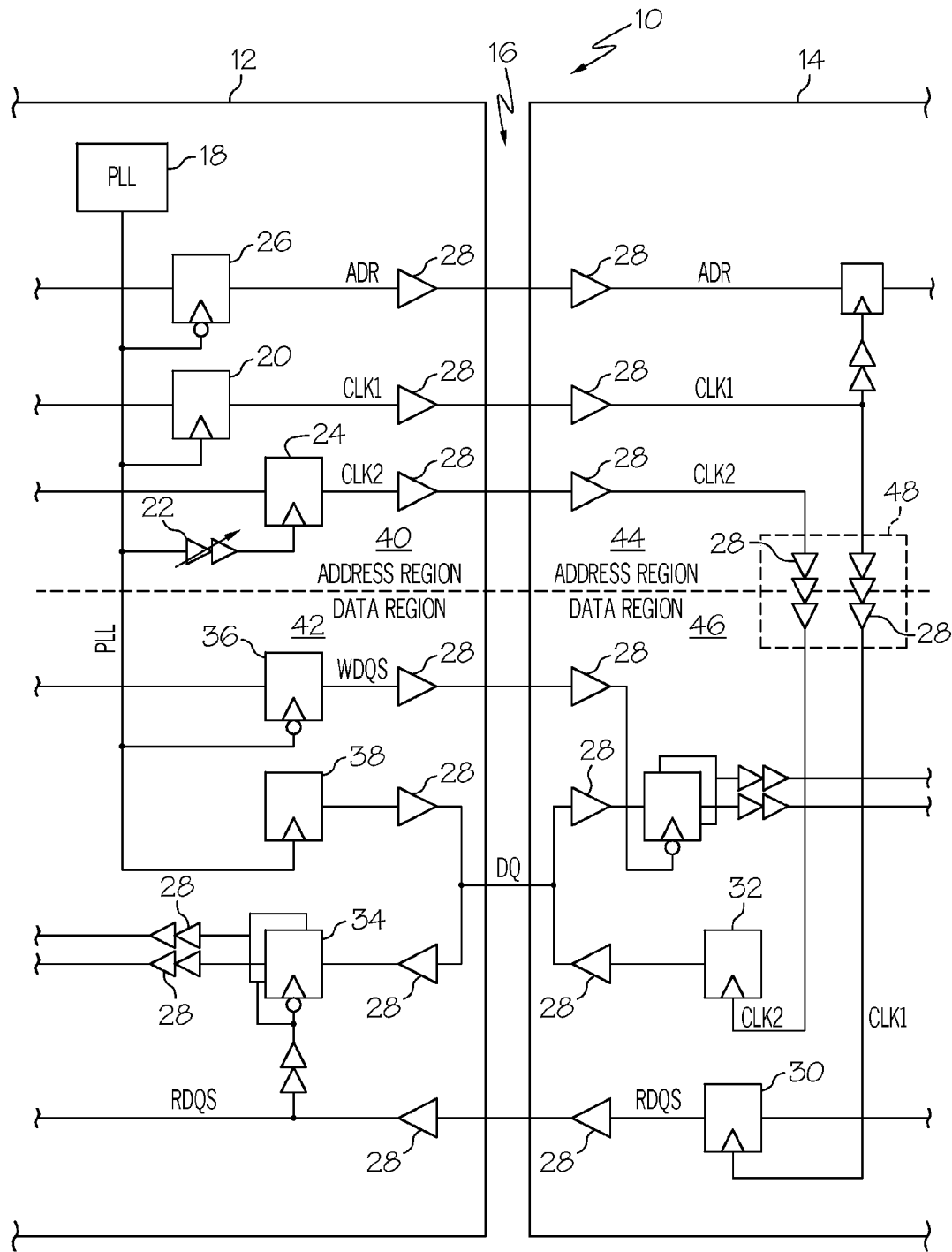
FIG. 1 is a schematic diagram of a first embodiment of a data communications system.
Figure 4:
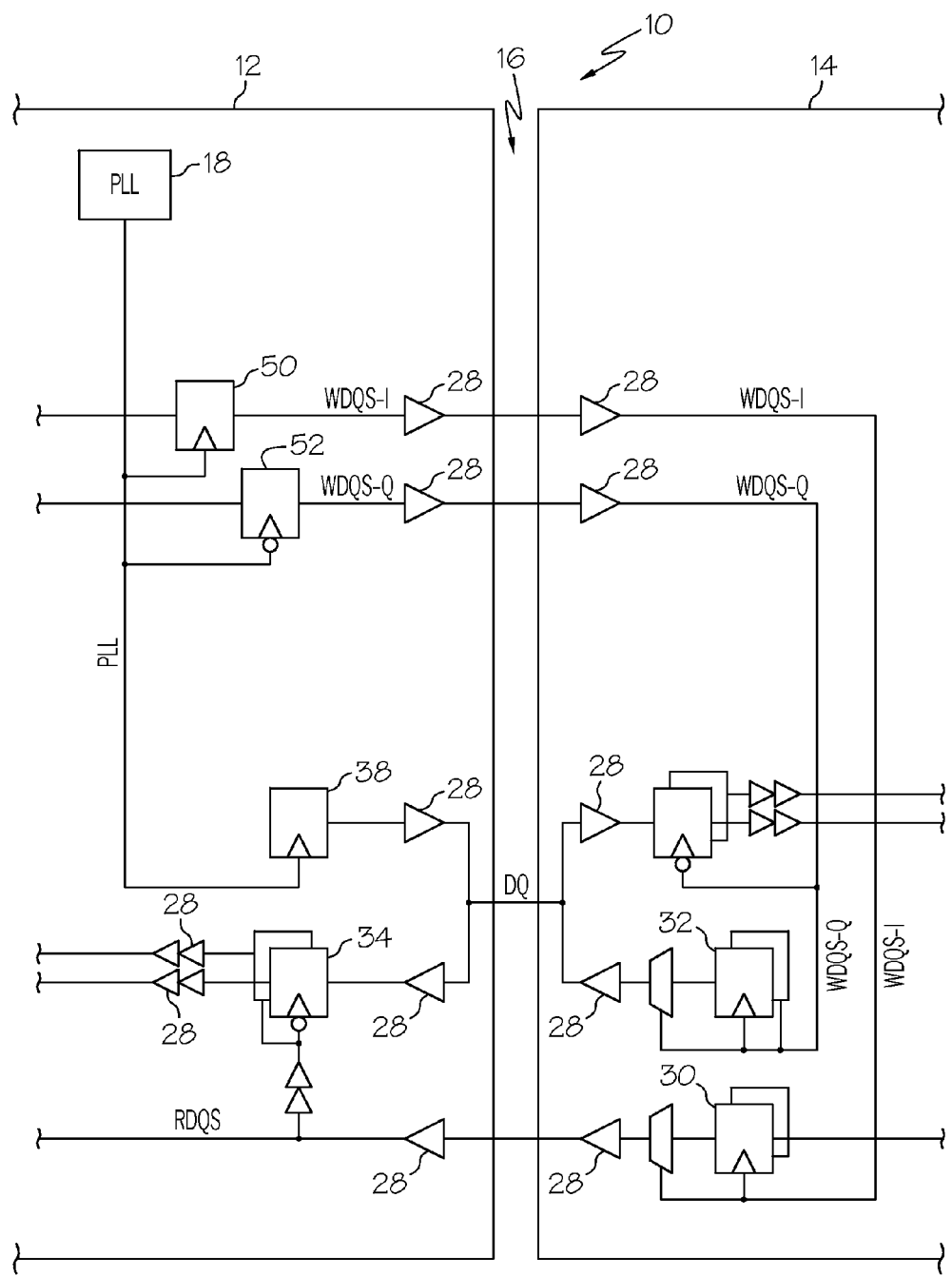
FIG. 4 is a schematic diagram of a second embodiment of the data communications system.

In the illustrated embodiments, as shown in FIGS. 1 and 4, the system 10 includes a first device 12 and a second device 14. As such, the data communications described herein occurs between the first and second devices 12, 14. In the illustrated embodiments, the first device 12 is a processing unit (not separately numbered), such as a central processing unit ("CPU") or graphics processing unit ("GPU"). Furthermore, the second device 14 is a memory (not separately numbered). More specifically, the second device of the illustrated embodiments is a dynamic random-access memory ("DRAM"). However, in other embodiments, other devices may be implemented as the first and second devices 12, 14 as will be appreciated by those skilled in the art.

The first and second devices 12, 14, in the illustrated embodiments, are electrically connected to one another. More specifically, a plurality of discrete electrical connections connects the first and second devices 12, 14. These electrical connections are referred to as a data communications channel 16, data communications channels 16, or simply "a channel", by those skilled in the art.

The first device 12 includes a phased-locked loop ("PLL") 18. The PLL 18 produces a PLL signal (labeled as "PLL"). In a first embodiment, as shown in FIG. 1, the first device 12 also includes a first clock flip-flop 20 for producing a first clock signal (labeled as "CLK1"). As appreciated by those skilled in the art, the clock signal oscillates between a high state and a low state at about a 50% duty cycle. The first clock flip-flop 20 of the illustrated embodiment is electrically connected to the PLL 18 and is positive-edge triggered by the PLL signal. That is, the first clock flip-flop 20 clocks on the rising edge of the PLL signal, i.e., when the PLL signal goes from low to high, to generate the first clock signal.

In the first embodiment, the first device 12 also includes a phase offset circuit 22 and a second clock flip-flop 24. In the first embodiment, the phase offset circuit 22 is electrically connected to the PLL 18 for receiving the PLL signal. However, in other embodiments, the phase offset circuit 22 may be electrically connected to the first clock flip-flop 20 for receiving the first clock signal.

Figure 2:
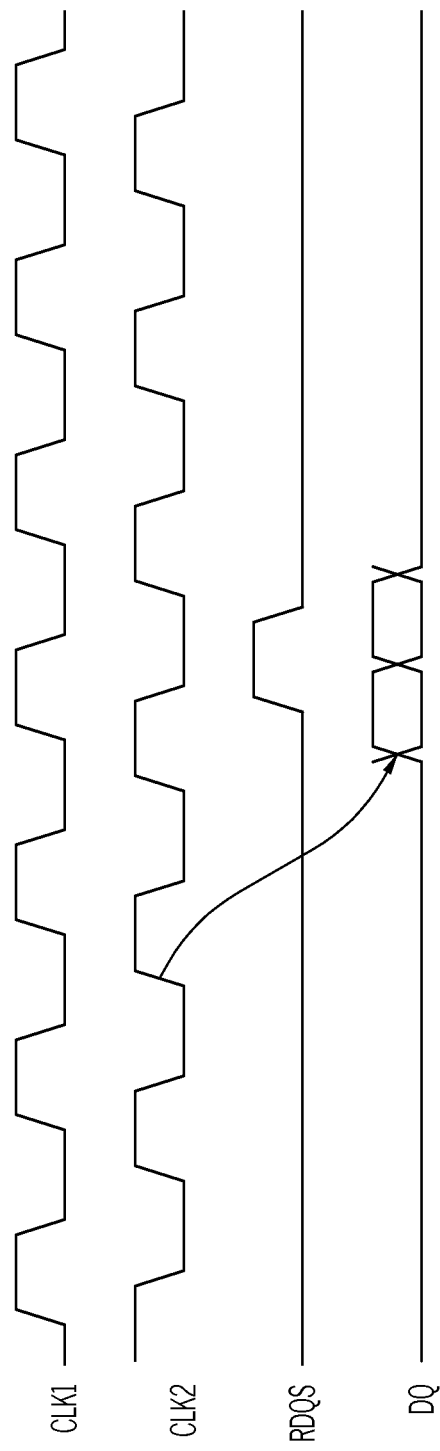
FIG. 2 is a timing diagram of signals in a read data operation of the first embodiment of the data communications system.

The second clock flip-flop 24 is electrically connected to the phase offset circuit 22. Together, the phase offset circuit 22 and the second clock flip-flop 24 generate a second clock signal (labeled as "CLK2"). The second clock signal has a phase offset from the first clock signal, as shown in FIG. 2. That is, the rising and falling edges of the second clock signal does not coincide with the rising and falling edges of the first clock signal. Said yet another way, the times at which the second clock signal goes to a high state are different from the times at which the first clock signal goes to a high state.

Referring again to FIG. 1, and as stated above, the second clock flip-flop 24 is electrically connected to the phase offset circuit 22. More specifically, an output (not numbered) from the phase offset circuit 22 is electrically connected to a clock input (not numbered) of the second clock flip-flop such that the second clock flip-flop 24 is positive edge triggered by the signal provided by the phase offset circuit 22.

The first device 12 may further include an address signal flip-flop 26 electrically connected to the PLL 18. The address signal flip-flop is negative-edge triggered by the PLL signal and generates an address signal (labeled as "ADR").

The first and second devices 12, 14 may further include a plurality of buffers 28 for buffering the various signals. Each buffer 28 handles the transmission or reception of one signal across the channel 16, as is appreciated by those skilled in the art. In the first embodiment, the first device 12 includes buffers 28 electrically connected to the first clock flip-flop 20, the second clock flip-flop 24, and the address signal flip-flop 26. Likewise, the second device 14 includes buffers 28 electrically connected to the buffers 28 of the first device 12 for receiving the signals.

In the first embodiment, the second device 14 includes a read strobe flip-flop 30. The read strobe flip-flop 30 is in communication with the first clock flip-flop 20. More specifically, the read strobe flip-flop 30 is operatively connected to the buffer 28 which provides the first clock signal. The read strobe flip-flop 30 regulates transmission of a read strobe signal utilizing the first clock signal. Said another way, the read strobe flip-flop 30 meters the read strobe signal with the first clock signal.

The read strobe signal is transmitted back to the first device 12. The read strobe signal is generated by the second device 14 to indicate transmission of a data transfer signal (labeled as "DQ") from the second device 14 to the first device 12. Specifically, in the first embodiment, the read strobe signal becomes active prior to transmission of the data transfer signal and terminates after the transmission of the data transfer signal is complete. As can be seen with reference to FIG. 1, buffers 28 may be utilized during transmission of the read strobe signal between the devices 12, 14.

The second device 14 of the first embodiment further includes a data-out flip-flop 32. The data-out flip-flop 32 is in communication with the phase offset circuit 22. More specifically, the data-out flip-flop 32 is electrically connected to the buffer 28 which provides the second clock signal from the second clock flip-flop 24. The data-out flip-flop 32 regulates transmission of the data transfer signal from the second device 14 to the first device 12.

The data transfer signal may be implemented as a plurality of data transfer signals to represent a plurality of data bits being transmitted in parallel with one another. As such, the data-out flip-flop 32 may be implemented as a plurality of data-out flip-flops 32. Buffers 28 are utilized to buffer the data transfer signal and the read strobe signal as they are transmitted from the second device 14 to the first device 12.

The first device 12 also includes a data-in flip-flop 34. The data-in flip-flop 34 is in communication with the read strobe signal. More specifically, in the first embodiment as illustrated, the data-in flip-flop 34 is electrically connected to a buffer 28 of the first device 12 which provides the read strobe signal from a buffer 28 of the second device 12. The data-in flip-flop 34 regulates transmission of the data transfer signal sent from the second device 14. In the first embodiment as shown in FIG. 1, a plurality of data-in flip-flops 34 is utilized. However, those skilled in the art realize that any number of data-in flip-flops 34 may be implemented.

The phase offset circuit 22 of the first embodiment allows for adjustment, or variation, in the amount of offset between the first clock signal and the second clock signal. Said another way, the time between the rising edge of the second clock signal may be adjusted with respect to the rising edge of the first clock signal. This adjustment may be controlled by the first device 12. By varying the phase offset of the second clock signal with respect to the first clock signal, the timing of the receipt of the data transfer signal may be adjusted at the first device 12 in an attempt to optimize the timing of the receipt of the data transfer signals. A timing diagram of the signals involved in a read operation (i.e., from the second device 14 to the first device 12) is shown in FIG. 2.

Figure 3:
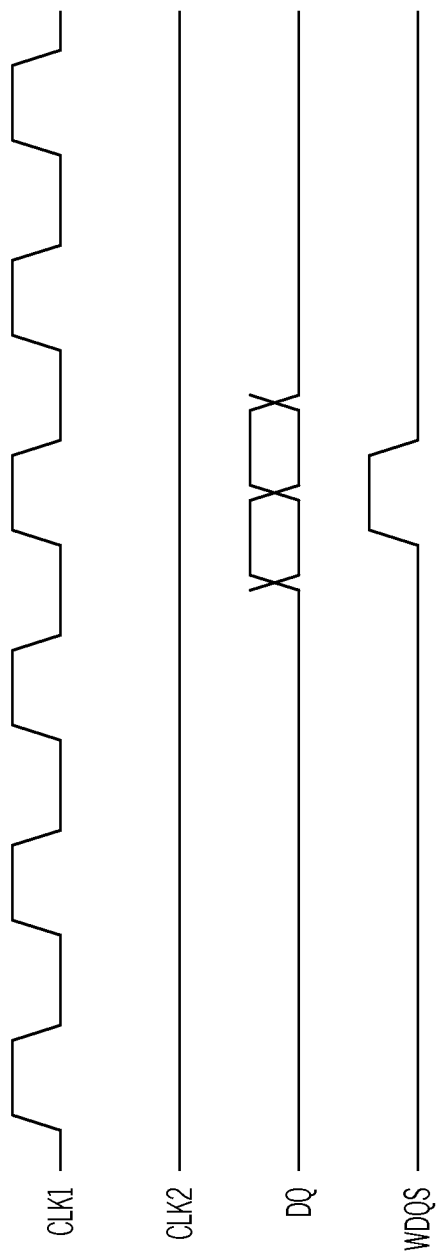
FIG. 3 is a timing diagram of signals in a write data operation of the first embodiment of the data communications system.

The first device 12 of the first embodiment also includes a write data strobe flip-flop 36 in communications with the PLL 18 for regulating transmission of a write data strobe signal (labeled as "WDQS") utilizing the PLL signal. The first device 12 further includes a data-out flip-flop 38 in communications with the PLL 18 for regulation transmission of a data transfer signal (labeled as "DQ") sent from the first device 12 to the second device 14 utilizing the WDQS signal. A timing diagram of the signals involved in a write operation (i.e., from the first device 12 to the second device 14) is shown in FIG. 3. During a write operation, the second clock signal may be interrupted, i.e., turned off The physical area of the first device 12 may include an address region 40 and a data region 42. The first clock flip-flop 20, phase offset circuit 22, second clock flip-flop 24, and address signal flip-flop 26 are disposed in the address region 40. The data-in flip-flop 34, the write data strobe flip-flop 36, and the write data flip-flop 38 are disposed in the data region 42. The physical area of the second device 14 may also include an address region 44 and a data region 46.

In a second embodiment of the system 10, as shown in FIG. 4, the first device 12 also includes a first write strobe flip-flop 50 for producing a first write strobe signal (labeled as "WDQS_I"). As appreciated by those skilled in the art, the first write strobe signal oscillates between a high state and a low state at about a 50% duty cycle. The first write strobe flip-flop 50 of the illustrated embodiment is electrically connected to the PLL 18 and is positive-edge triggered by the PLL signal. That is, the first write strobe flip-flop 50 clocks on the rising edge of the PLL signal, i.e., when the PLL signal goes from low to high, to generate the first write strobe signal.

The first device 12 of the second embodiment also includes a second write strobe flip-flop 52 for producing a second write strobe signal (labeled as "WDQS_Q"). As appreciated by those skilled in the art, the second write strobe signal oscillates between a high state and a low state at about a 50% duty cycle. The second write strobe flip-flop 52 of the illustrated embodiment is electrically connected to the PLL 18 and is negative-edge triggered by the PLL signal. That is, the second write strobe flip-flop 52 clocks on the falling edge of the PLL signal, i.e., when the PLL signal goes from high to low, to generate the second write strobe signal. As such, the second write strobe signal has a phase offset from the first write strobe signal. That is, the rising and falling edges of the second write strobe signal do not coincide with the rising and falling edges of the first write strobe signal. However, in other embodiments, the phase shift between the first and second write strobe signals may be generated a phase offset circuit 22, as is illustrated with respect to the first embodiment, a delayed-lock loop ("DLL"), or other techniques known to those skilled in the art.

As with the first embodiment, the second device 14 of the second embodiment includes a read strobe flip-flop 30. In the second embodiment, however, the read strobe flip-flop 30 is in communication with the first write strobe flip-flop 50. More specifically, the read strobe flip-flop 30 is operatively connected to the buffer 28 which provides the first write strobe signal. The read strobe flip-flop 30 regulates transmission of a read strobe signal utilizing the first write strobe signal. Said another way, the read strobe flip-flop 30 meters the read strobe signal with the first write strobe signal.

The second device 14 of the second embodiment further includes at least one data-out flip-flop 32. The data-out flip-flop 32 is in communication with the second write strobe flip-flop 52. More specifically, the data-out flip-flop 32 is electrically connected to the buffer 28 which provides the second write strobe signal. The data-out flip-flop 32 regulates transmission of a data transfer signal from the second device 14 to the first device 12.

As with the first embodiment, the read strobe signal of the second embodiment is transmitted back to the first device 12. The read strobe signal is generated by the second device 14 to indicate transmission of a data transfer signal from the second device 14 to the first device 12. Specifically, in the second embodiment, the read strobe signal becomes active prior to transmission of the data transfer signal and terminates after the transmission of the data transfer signal is complete.

The first device 12 of the second embodiment also includes at least one data-in flip-flop 34. The data-in flip-flop 34 is in communication with the read strobe signal. More specifically, the data-in flip-flop 34 is electrically connected to a buffer 28 of the first device 12 which provides the read strobe signal from a buffer 28 of the second device 12. The data-in flip-flop regulates transmission of the data transfer signal sent from the second device 14.

The system 10 and associated method provide numerous advantages over prior art circuits and techniques. Importantly, no delay lock loop ("DLL") circuit is necessary to define the offset between the clock signal and the data signal. As such, the system 10 of the subject invention more efficiently utilizes available physical space and uses less power than prior art systems. Also, the lack of the DLL circuit improves "lock time", i.e., the time to begin transmission of data across the channel 16. Furthermore, in the first embodiment, since the first device 12 controls the relative phase of the first and second clock signals, different implementations of the second device 14 may be easily compensated for.

Embodiments of the present invention have been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of data communications, comprising:
   transmitting first and second clock signals from a first device for receipt by a second device, wherein the second clock signal has a phase offset from the first clock signal;
   receiving a read strobe signal from the second device at the first device wherein the read strobe signal was regulated by the first clock signal; and
   receiving a data transfer signal from the second device at the first device wherein the data transfer signal was regulated by the second clock signal.

2. A method as set forth in claim 1, further comprising varying the phase offset of the second clock signal with respect to the first clock signal to adjust the timing of the receipt of the data transfer signal at the first device.

3. A method as set forth in claim 1, further comprising regulating transmission of the data transfer signal sent received by the first device utilizing the read strobe signal received by the first device.

4. A method as set forth in claim 1, further comprises generating a phase-lock loop ("PLL") signal with a PLL circuit and regulating the PLL signal to generate the first clock signal.

5. A method as set forth in claim 4, further comprising regulating transmission of an address signal sent from the first device for receipt by the second device utilizing the PLL signal.

6. A method as set forth in claim 1, further comprising regulating transmission of a write data strobe signal from the first device for receipt by the second device utilizing the PLL signal.

7. A method as set forth in claim 1, further comprising regulating transmission of a data transfer signal sent from the first device for receipt by the second device utilizing the PLL signal.

8. A device for use in a data communications system, said device comprising:
   a phase offset circuit electrically connected to a clock circuit for generating a second clock signal having a phase offset from a first clock signal; and
   a data-in flip-flop for receiving a read strobe signal and regulating transmission of a data transfer signal received from an external device utilizing the read strobe signal.

9. A device as set forth in claim 8, wherein the device is configured to vary the phase offset of the second clock signal with respect to the first clock signal to adjust the timing of the receipt of the data transfer signal at the device.

10. A device as set forth in claim 8, wherein said clock circuit comprises a phased-locked loop ("PLL") for producing a PLL signal in communication with a first clock flip-flop for producing the first clock signal.

11. A device as set forth in claim 10, further comprising an address signal flip-flop in communications with said PLL for regulating an address signal using the PLL signal.

12. A device as set forth in claim 10, further comprising a write data strobe flip-flop in communications with said PLL for regulating transmission of a write data strobe signal utilizing the PLL signal.

13. A device as set forth in claim 10, further comprising a data-out flip-flop in communications with said PLL for regulation transmission of a data transfer signal utilizing the PLL signal.

14. A method of data communications at a device, said method comprising:
 receiving a first clock signal;
 receiving a second clock signal having a phase offset from the first clock signal;
 regulating transmission of a read strobe signal to another device utilizing the first clock signal; and
 regulating transmission of a data transfer signal to another device utilizing the second clock signal.

15. A method as set forth in claim 14, further comprising receiving a write data strobe signal and receiving a data transfer signal.

16. A method as set forth in claim 15, further comprising regulating transmission of the data transfer signal utilizing the write data strobe signal.

17. A method of data communications between a first device and a second device, said method comprising:
 transmitting first and second clock signals from the first device for receipt by the second device, wherein the second clock signal has a phase offset from the first clock signal;
 regulating transmission of a read strobe signal sent from the second device for receipt by the first device utilizing the first clock signal; and
 regulating transmission of a data transfer signal sent from the second device for receipt by the first device utilizing the second clock signal.

18. A method as set forth in claim 17, further comprising varying the phase offset of the second clock signal with respect to the first clock signal to adjust the timing of the receipt of the data transfer signal at the first device.

19. A method as set forth in claim 17, further comprising regulating transmission of the data transfer signal sent from the second device at the first device utilizing the read strobe signal sent from the second device.

20. A method as set forth in claim 17, wherein generating a first clock signal at the first device further comprises generating a phase-lock loop ("PLL") signal with a PLL circuit and regulating the PLL signal to generate the first clock signal.

21. A method as set forth in claim 20, further comprising regulating transmission of an address signal sent from the first device to the second device utilizing the PLL signal.

22. A method as set forth in claim 17, further comprising regulating transmission of a write data strobe signal from the first device utilizing the PLL signal.

23. A method as set forth in claim 17, further comprising regulating transmission of a data transfer signal sent from the first device to the second device utilizing the PLL signal.

24. A data communications system, comprising:
 a first device including:
  a clock circuit for generating a first clock signal; and
  a phase offset circuit electrically connected to said clock circuit for generating a second clock signal having a phase offset from the first clock signal; and
 a second device including:
  a read strobe flip-flop in communication with said clock circuit for regulating transmission of a read strobe signal sent to said first device utilizing the first clock signal; and
  a data-out flip-flop in communication with said phase offset circuit for regulating transmission of a data transfer signal sent to said first device utilizing the second clock signal.

25. A system as set forth in claim 24, wherein said first device further includes a data-in flip-flop in communication with the read strobe signal for regulating transmission of the data transfer signal sent from said second device.

26. A system as set forth in claim 24, wherein said first device is capable of varying the phase offset of the second clock signal with respect to the first clock signal to adjust the timing of the receipt of the data transfer signal at the first device.

27. A system as set forth in claim 24, wherein said clock circuit is further defined as a phased-locked loop ("PLL") for producing a PLL signal in communication with a first clock flip-flop for producing the first clock signal.

28. A system as set forth in claim 27, wherein said first device further includes an address signal flip-flop in communications with said PLL for regulating an address signal using the PLL signal.

29. A system as set forth in claim 27, wherein said first device further includes a write data strobe flip-flop in communications with said PLL for regulating transmission of a write data strobe signal utilizing the PLL signal.

30. A system as set forth in claim 27, wherein said first device further includes a data-out flip-flop in communications with said PLL for regulation transmission of a data transfer signal sent from the first device to the second device utilizing the PLL signal.

31. A system as set forth in claim 24, wherein said first device is further defined as a processing unit.

32. A system as set forth in claim 24, wherein said second device is further defined as a memory.

* * * * *